(12) United States Patent
Chiang et al.

(10) Patent No.: US 7,494,351 B2
(45) Date of Patent: Feb. 24, 2009

(54) CONNECTOR FOR ATTACHMENT OF A PERIPHERAL DEVICE TO A COMPUTER

(75) Inventors: Hsiao-Lung Chiang, Taipei (TW); Chih-Hung Lin, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 11/624,009

(22) Filed: Jan. 17, 2007

(65) Prior Publication Data

US 2008/0050979 A1 Feb. 28, 2008

(30) Foreign Application Priority Data

Aug. 25, 2006 (TW) .............................. 95131262 A

(51) Int. Cl.
*G09G 5/00* (2006.01)
(52) U.S. Cl. .................. 439/148; 345/163; 248/309.4
(58) Field of Classification Search .............. 439/39, 439/148; 361/679, 681, 683; 345/163, 164; 248/309.4
See application file for complete search history.

(56) References Cited

U.S. PATENT DOCUMENTS

| | | | | |
|---|---|---|---|---|
| 4,295,702 A | * | 10/1981 | Snyder | 439/425 |
| 5,126,955 A | * | 6/1992 | Tomoda | 361/680 |
| 5,409,107 A | * | 4/1995 | Browne | 206/305 |
| 5,726,684 A | * | 3/1998 | Blankenship et al. | 345/167 |
| 6,469,681 B1 | * | 10/2002 | Jones et al. | 343/906 |
| 6,476,795 B1 | * | 11/2002 | Derocher et al. | 345/163 |
| 6,565,363 B2 | * | 5/2003 | Downing | 439/39 |
| 6,784,870 B2 | * | 8/2004 | Yin | 345/156 |
| 2005/0284993 A1 | * | 12/2005 | Ternus et al. | 248/206.5 |
| 2006/0082553 A1 | * | 4/2006 | Lin | 345/163 |

* cited by examiner

*Primary Examiner*—Neil Abrams
(74) *Attorney, Agent, or Firm*—Apex Juris, pllc; Tracy M Heims

(57) ABSTRACT

A connector provided for coupling a computer peripheral device with a RJ11 or RJ45 data communication socket of a computer. The connector includes a first connecting part and a second connecting part. The first connecting part has a shape mating with said data communication socket. The second connecting part includes a magnetic element such that the connector is attachable onto said computer peripheral device. The peripheral may be a mouse provided with a magnetic plate to cooperate with the whereby the mouse, when not in use, may be removably retained to the computer.

3 Claims, 7 Drawing Sheets

CONNECTOR FOR ATTACHMENT OF A PERIPHERAL DEVICE TO A COMPUTER

FIELD OF THE INVENTION

The present invention relates to a connector, and more particularly to a connector for coupling a data communication socket with a computer peripheral device.

BACKGROUND OF THE INVENTION

In modern society, notebook computers are increasingly used because they are portable and convenient. For most notebook computers, a touch pad is used as the input device.

Furthermore, in order to comply with most users' habits, a mouse is also served as the input device of the notebook computer. Especially when the notebook computer is used in the office, the mouse becomes an essential peripheral device.

In a case that the notebook computer needs to be used in other places, for example in a conference room, the user should carry the corresponding mouse at the same time. In other words, since the mouse and the mouse are separate components, the probability of falling down the mouse is increased during the process of carrying the notebook computer along with the mouse.

For a purpose of solving such a problem, a mouse attachable to the notebook computer is disclosed in U.S. Pat. No. 6,784,870, entitled "Portable computer system including detachable peripheral device and combined mouse/joystick for use with same". Please refer to FIG. 1. The notebook computer having a detachable mouse as shown in U.S. Pat. No. 6,784,870 comprises a notebook computer 10, a mouse body 20 and a coupling mechanism 30. By means of the coupling mechanism 30, the mouse body 20 is attached to the notebook computer 10.

Another design for attaching the mouse onto the notebook computer is disclosed in Taiwanese Patent Bulletin No. 398642, entitled "Device for storing a mouse within the casing of a computer". Please refer to FIG. 2. As shown in Taiwanese Patent Bulletin No. 398642, the notebook computer 40 has a receptacle 50 for storing the mouse 60 therein.

Depending on the type of the mouse, however, the coupling mechanism for attaching or storing the mouse is varied. In other words, different types of mice fail to be attached onto a same type of notebook computer, and thus the coupling mechanism is not user-friendly.

For further solving the above drawbacks, a new approach was disclosed in a co-pending Taiwanese Patent Application No. 94143533, entitled "Mouse having a storable hook module", which was filed by the same assignee of the present application on Dec. 29, 2005.

Please refer to FIG. 3. The Mouse having a storable hook module as shown in Taiwanese Patent Application No. 94143533 comprises a hook module 70, which is storable within the mouse. A lock hole 80, which is commonly arranged in a notebook computer as a standard accessory, is also shown in FIG. 3. The lock hole 80 is referred as a "Kensington lock hole". In a case that a lock is attached to the lock hole 80, the notebook will be fixed to any immovable object such as a desk, thereby reducing the chance of the notebook being stolen. Generally, notebook computers exhibited in the computer center or the exhibition place are locked in these lock holes. According to the disclosure of Taiwanese Patent Application No. 94143533, the hook module 70 may be attached onto the notebook computer by hooking a hooking part on the lock hole 80. The design of FIG. 3 is applicable to many types of notebook computers because the Kensington lock hole is a common accessory for most notebook computers.

Although the design of FIG. 3 may facilitate attaching a mouse onto a notebook computer and overcome the problems as described in FIGS. 1 and 2, there are still some drawbacks. For example, since the hook module 70 includes many components, the process of assembling the hook module 70 is complicated and the fabricating cost is increased. In addition, for storing the hook module 70 within the mouse, a receptacle is required and thus the overall volume of the mouse is also increased.

In views of the above-described disadvantages of the prior art, the applicant keeps on carving unflaggingly to develop a connector for facilitating attaching a mouse onto a notebook computer according to the present invention through wholehearted experience and research.

SUMMARY OF THE INVENTION

It is an object of the present invention to provide a connector for coupling a RJ11 or RJ45 data communication socket of a notebook computer with a mouse so as to facilitate attaching the mouse onto the notebook computer.

In accordance with an aspect of the present invention, there is provided a connector for coupling a computer peripheral device with a RJ11 or RJ45 data communication socket. The connector includes a first connecting part and a second first connecting part. The first connecting part has a shape mating with said data communication socket. The second connecting part includes a magnetic element such that the connector is attachable onto said computer peripheral device.

Preferably, the connector is integrally formed into one piece.

In an embodiment, the first connecting part includes a first surface and a second surface parallel with each other. A resilient arm is protruded from the first surface. A notch is formed in the second surface.

In an embodiment, the connector further comprises a protruding periphery between the first connecting part and the second connecting part.

In an embodiment, the computer peripheral device is a mouse, and the mouse includes a lower cover having a recess for accommodating a metallic plate therein.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 4:
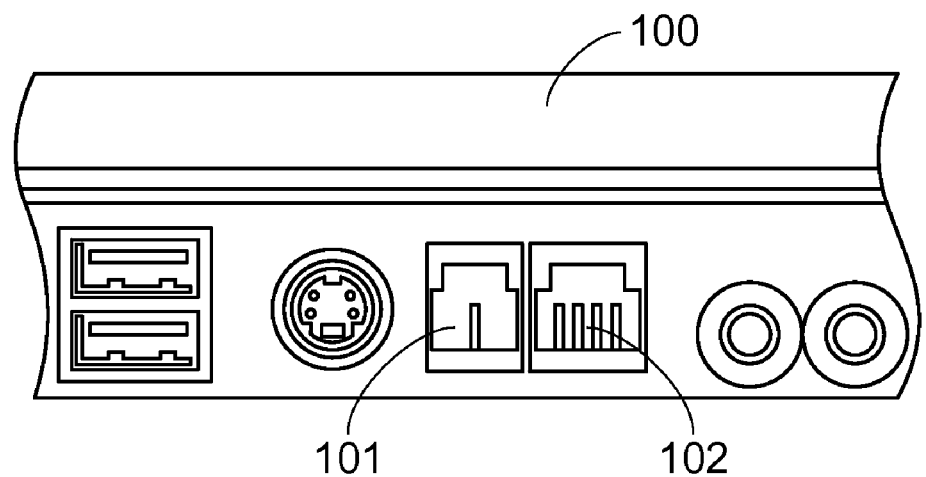
FIG. 4 is a schematic side view illustrating the RJ11 port and the RJ45 port of a typical notebook computer.

Referring to FIG. 4, a schematic side view of a typical notebook computer is illustrated. The notebook computer 100 of FIG. 4 includes two data communication sockets 101 and 102. The data communication socket 101 is a RJ11 port communicated with a modem. The data communication socket 102 is a RJ45 port to be communicated with the local area network.

Figure 5:
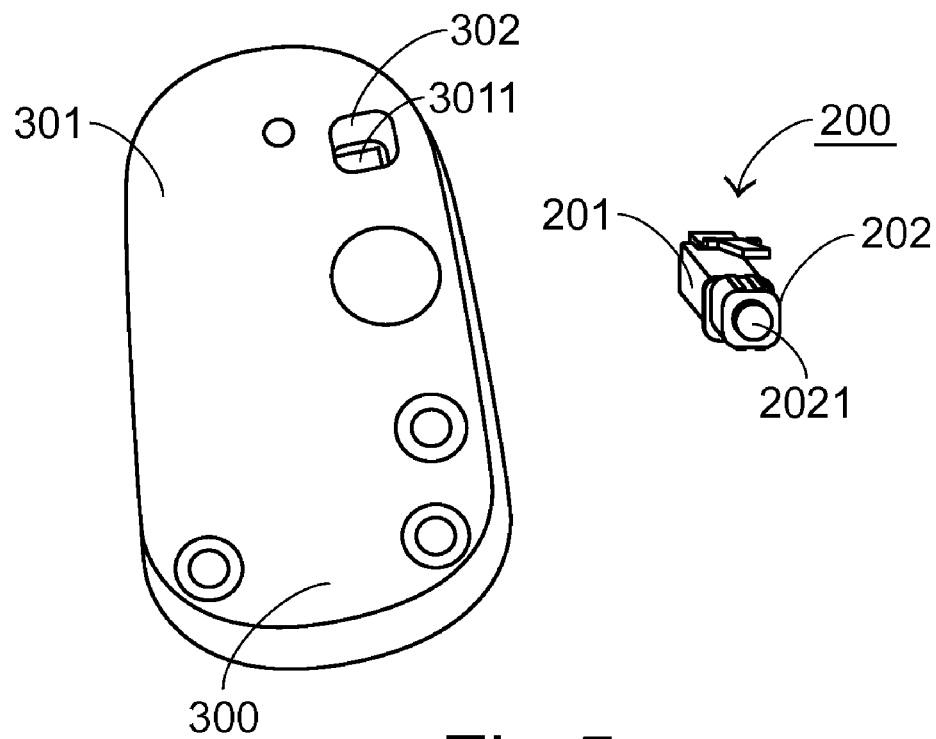
FIG. 5 illustrates a connector used in a mouse according to a preferred embodiment of the present invention.

Please refer to FIG. 5, which illustrates a connector 200 used in a mouse 300 according to a preferred embodiment of the present invention. The connector 200 includes a first connecting part 201 and a second connecting part 202. The mouse 300 has a lower cover 301. A recess 302 is formed in the lower cover 301, and a metallic plate 3011 is received in the recess 302. The second connecting part 202 of the connector 200 includes a magnetic element 2021. The first connecting part 201 of the connector 200 may be inserted into the RJ11 port 101 or the RJ45 port 102 of the notebook computer 100. The magnetic element 2021 of the second connecting part 202 may be magnetically coupled to the metallic plate 3011 of the lower cover 301 such that the connector 200 is attached onto the mouse 300. Via the connector 200, the mouse 300 is attachable onto the notebook computer 100.

Figure 6:
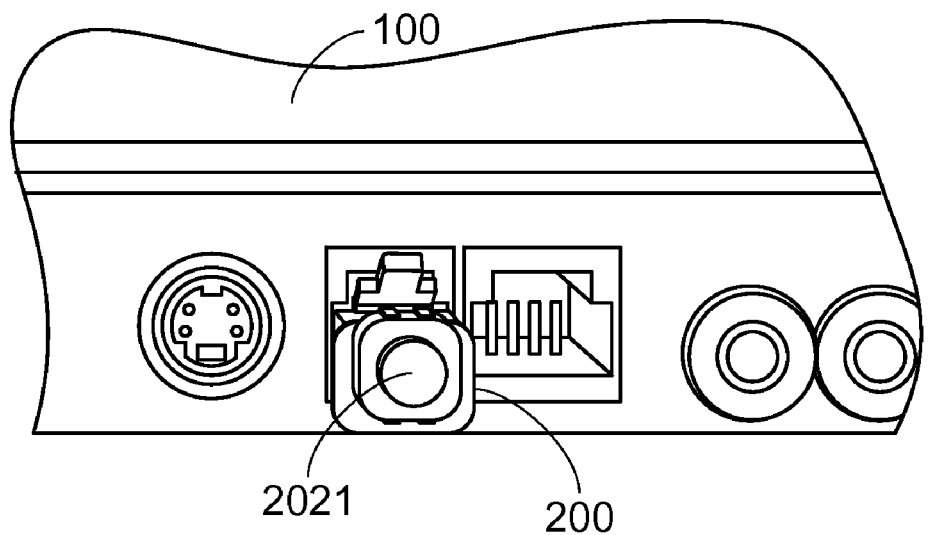
FIG. 6 schematically illustrates that the connector of the present invention is inserted into a RJ11 port of a notebook computer.
Figure 7:
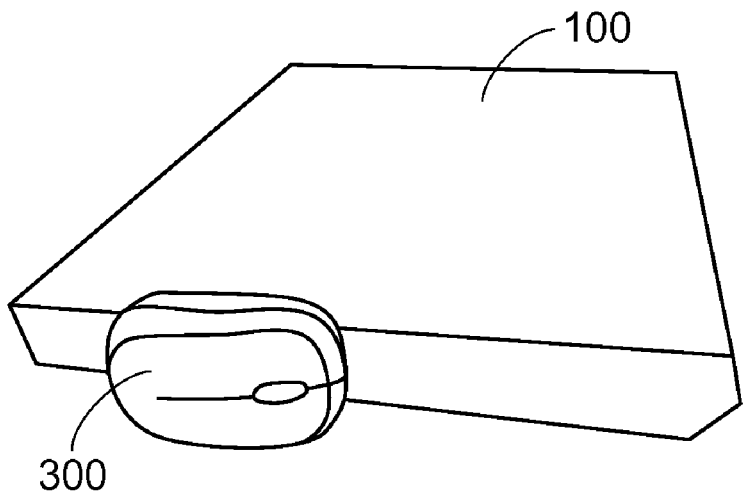
FIG. 7 schematically illustrates that the mouse is attached onto the notebook computer via the connector of the present invention.

The process of attaching the mouse 300 onto the notebook computer 100 will be illustrated with FIG. 6 and FIG. 7. Firstly, the first connecting part 201 of the connector 200 is inserted into the RJ11 port 101 of the notebook computer 100. After the magnetic element 2021 of the second connecting part 202 is magnetically coupled to the metallic plate 3011 of the lower cover 301, the mouse 300 is attached onto a sidewall of the notebook computer 100, as is shown in FIG. 7.

Figure 1:
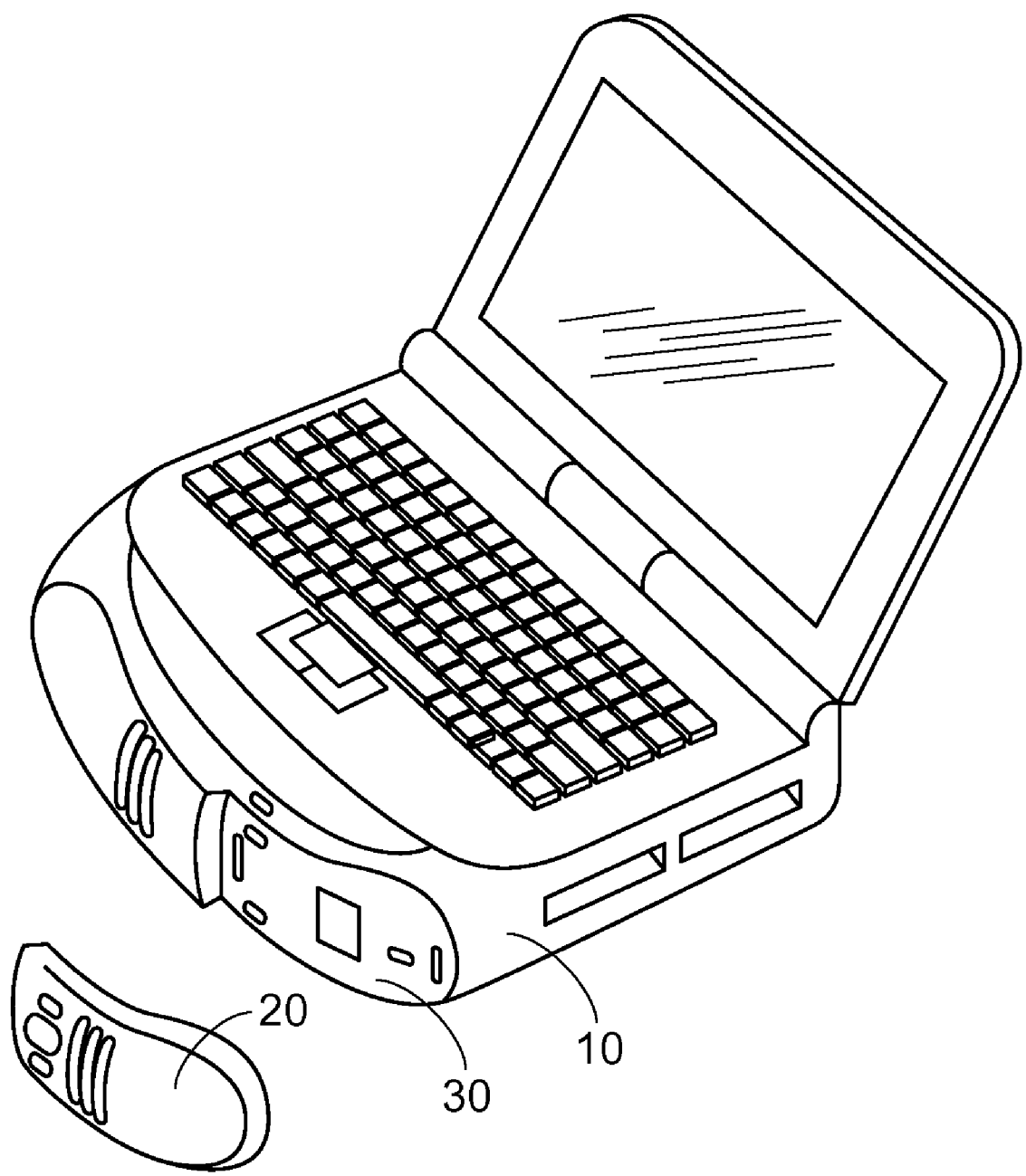
FIG. 1 is a schematic view of a notebook computer having an attachable mouse, which is disclosed in U.S. Pat. No. 6,784,870.
Figure 2:
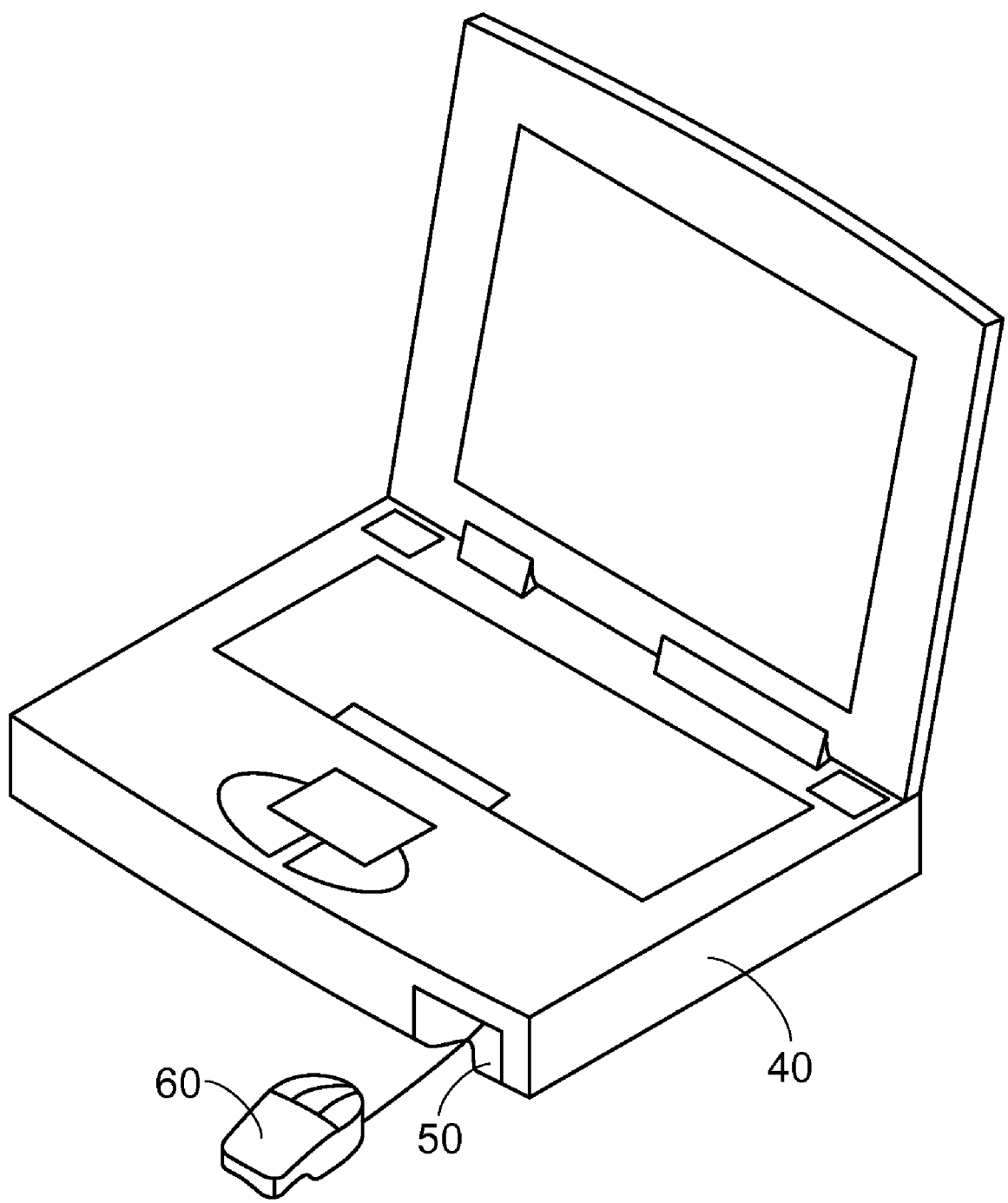
FIG. 2 is a schematic view of another notebook computer having an attachable mouse, which is disclosed in Taiwanese Patent No. 398642.
Figure 3:
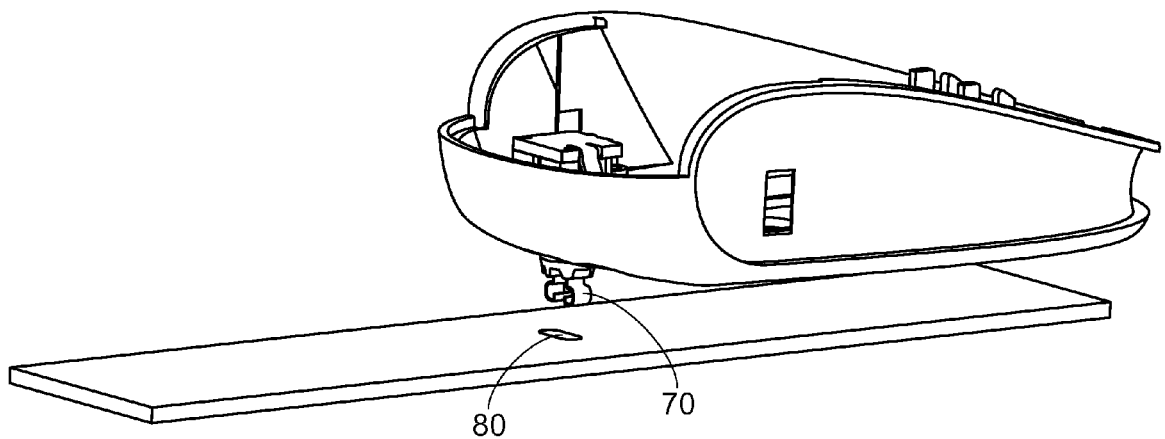
FIG. 3 is a schematic view of a mouse having a storable hook module, which is disclosed in Taiwanese Patent Application No. 94143533.
Figure 8A:
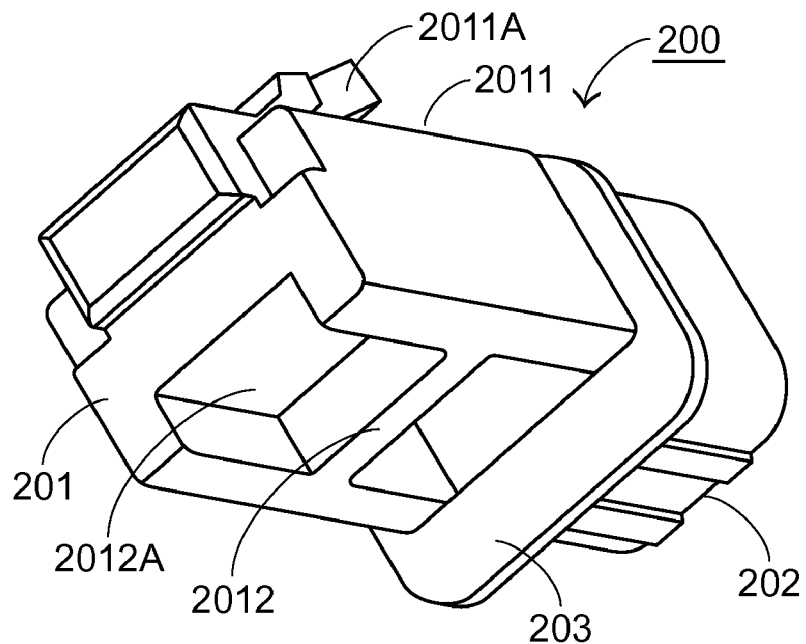
FIG. 8(a) is a schematic perspective view illustrating the connector taken from the viewpoint in the direction of the first connecting part.
Figure 8B:
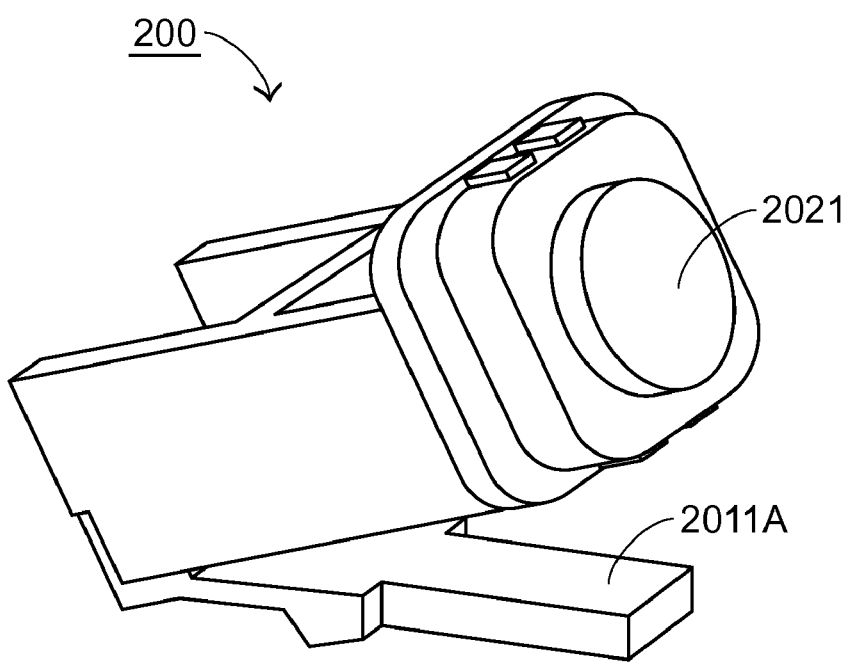
FIG. 8(b) is a schematic perspective view illustrating the connector taken from the viewpoint in the direction of the second connecting part.

Please refer to FIGS. 8(a) and 8(b), which are schematic perspective views of the connector 200 as shown in FIG. 2 and taken from the viewpoints in the directions of the first connecting part 201 and the second connecting part 202, respectively.

Figure 8C:
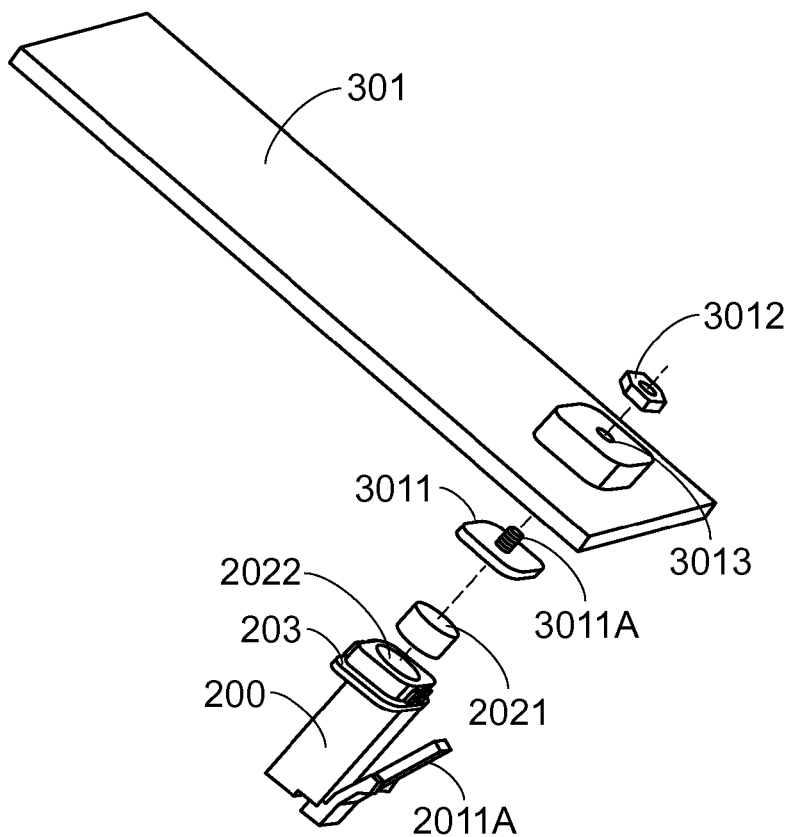
FIG. 8(c) is a schematic exploded view illustrating the connection between the connector and the mouse.
Figure 8D:
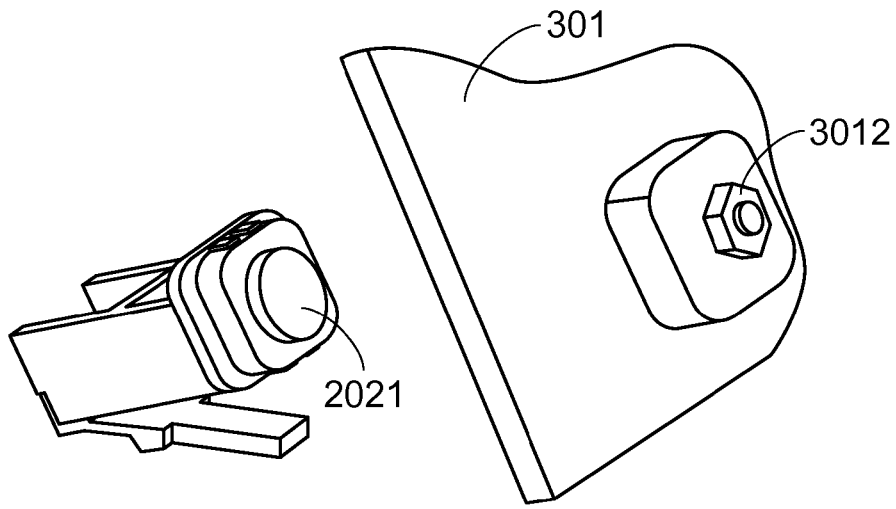
FIG. 8(d) is a schematic assembled view illustrating the connector and the mouse.

In FIGS. 8(a) and 8(b), the connector 200 includes the first connecting part 201 and the second connecting part 202. The first connecting part 201 has a shape mating with the RJ11 port 101, and comprises a first surface 2011 and a second surface 2012. The first surface 2011 and the second surface 2012 are parallel with each other. A resilient arm 2011A is protruded from the first surface 2011. The second surface 2012 has a notch 2012A therein. The second connecting part 202 has a shape mating with the recess 302 of the lower cover 301. After the second connecting part 202 is received in the recess 302 of the lower cover 301, the magnetic element 2021 of the second connecting part 202 attracts the metallic plate 3011 within the recess 302 of the lower cover 301. Please refer to FIG. 8(c), which is a schematic exploded view illustrating the connection between the connector 200 and the mouse 300. The lower cover 301 further includes a perforation 3013. A thread structure 3011A is extruded from a surface of the metallic plate 3011. After the thread structure 3011A of the metallic plate 3011 penetrates through the perforation 3013 of the mouse 300, the thread structure 3011A and a nut 3012 are screwed together. Meanwhile, the metallic plate 3011 is received within the recess 302 and the metallic plate 3011 is attached onto the lower cover 301. Furthermore, the second connecting part 202 has an indentation 2022 for partially accommodating the magnetic element 2021 therein. The resulting structures are shown in FIG. 8(d).

In addition, a protruding periphery 203 is arranged between the first connecting part 201 and the second connecting part 202. When the second connecting part 202 is inserted into the recess 302 of the mouse 300 such that the protruding periphery 203 is in contact with the mouse 300, the mouse 300 is well attached onto the notebook computer 100.

The configuration and the operation principle of the connector 200 will be described as follows in more details. Please refer to FIGS. 8(a) and 8(b). The first connecting part 201 includes the resilient arm 2011A at the first surface 2011 and has a shape mating with the RJ11 port 101. During the first connecting part 201 is inserted into the RJ11 port 101, the resilient arm 2011A is pressed toward the first surface 2011. In response to restoring force of the resilient arm 2011A, the resilient arm 2011A is sustained against the inner wall of the RJ11 port 101 and thus the first connecting part 201 is securely engaged with the RJ11 port 101. That is, the mechanism of coupling the first terminal 201 and the RJ11 port 101 is substantially identical to the conventional mechanism of coupling a RJ11 plug with a RJ11 port.

In response to a pulling force applied on the mouse 300, the mouse 300 is disengaged from the second connecting part 202 of the connector 200 and thus the mouse 300 will be detached from the notebook computer 100. In order to remove the connector 200 from the RJ11 port 101, the resilient arm 2011A should be pressed toward the first surface 2011 again. Under this circumstance, the resilient arm 2011A is not sustained against the inner wall of the RJ11 port 101 and the first connecting part 201 of the connector 200 can be withdrawn from the RJ11 port 101.

As known, the conventional RJ11 plug has electrical contacts to be electrically connected to the corresponding electrical contacts inside the RJ11 port. Since the connector 200 of the present invention is used for facilitating attaching the mouse 300 onto the notebook computer 100, the electrical connection between the connector 200 and the RJ11 port 101 is no longer required. Please refer to FIG. 8(a) again. Since the notch 2012A is formed in the second surface 2012 of the first connecting part 201, the first connecting part 201 will not touch the electrical contacts inside the RJ11 port and the probability of damaging the electrical contacts inside the RJ11 port is avoided when the first connecting part 201 is inserted into the RJ11 port 101.

Form the above description, the mouse 300 is attached onto the sidewall of the notebook computer 100 by the attraction between the magnetic element 2021 of the second connecting part 202 and the metallic plate 3011 of the lower cover 301. As a result, the approach of coupling the mouse 300 and the notebook computer 100 is simply and user-friendly by using the connector 200 of the present invention.

From the above description, the connector of the present invention is advantageous for facilitating attaching the mouse onto the notebook computer by coupling the first connecting part of the connector with the RJ11 or RJ45 port. Since the RJ11 and RJ45 ports are common data communication socket of the notebook computer, the connector of the present invention is applicable to all kinds of notebook computers. In addition, the mechanism of coupling the first connecting part with the RJ11 or RJ45 port is substantially identical to the conventional mechanism of coupling the RJ11 or RJ45 plug with a RJ11 or RJ45 port, and thus a secure engagement between the connector and the data communication socket is rendered. Since the magnetic element 2021 of the second connecting part 202 is magnetically coupled to the metallic plate 3011 of the lower cover 301, the approach of coupling the mouse 300 and the notebook computer 100 is simply and user-friendly. Moreover, only one connector of the present invention is sufficient for facilitating attaching the mouse onto the notebook computer. It is preferred that the connector of the present invention is integrally formed into one piece so as to reduce fabricating costs.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An integrally formed connector for coupling a computer peripheral device with a RJ11 or RJ45 data communication socket, said connector comprising:
    a first connecting part having a shape mating with said data communication socket; and
    a second connecting part that includes a magnetic element and that is attachable onto said computer peripheral device,
    wherein said computer peripheral device includes a recess for accommodating a metallic plate therein; and
    said magnetic element is proportional to the recess, is inserted into said recess and magnetically couples to the metallic plate to attach the computer peripheral device.

2. The connector according to claim 1 wherein said first connecting part includes a first surface and a second surface parallel with each other, a resilient arm is protruded from said first surface, and a notch is formed in said second surface.

3. The connector according to claim 1 further comprising a protruding periphery between said first connecting part and said second connecting part.

* * * * *